United States Patent
Fukuda et al.

(10) Patent No.: US 7,775,423 B2
(45) Date of Patent: Aug. 17, 2010

(54) PORTABLE ELECTRONIC DEVICE AND CONTROL METHOD OF PORTABLE ELECTRONIC DEVICE

(75) Inventors: Aki Fukuda, Yokohama (JP); Kazuhiro Ishibe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/049,820

(22) Filed: Mar. 17, 2008

(65) Prior Publication Data

US 2008/0237333 A1    Oct. 2, 2008

(30) Foreign Application Priority Data

Mar. 29, 2007   (JP)   ............................. 2007-086139
May 29, 2007    (JP)   ............................. 2007-142201

(51) Int. Cl.
*G06F 17/00* (2006.01)

(52) U.S. Cl. .................. 235/375; 235/472.01; 235/493; 235/385; 235/492; 235/380; 235/487

(58) Field of Classification Search ............ 235/472.01, 235/375, 493, 385, 492, 380, 487
See application file for complete search history.

(56) References Cited

U.S. PATENT DOCUMENTS

| | | | |
|---|---|---|---|
| 5,126,541 A * | 6/1992 | Shinagawa ................... 235/438 |
| 5,365,045 A | 11/1994 | Iijima |
| 5,383,161 A | 1/1995 | Sanemitsu |
| 5,517,014 A | 5/1996 | Iijima |
| 5,729,717 A | 3/1998 | Tamada et al. |
| 6,292,874 B1 | 9/2001 | Barnett |
| 6,667,905 B2 | 12/2003 | Dono et al. |
| 7,096,366 B1 | 8/2006 | Watanabe |
| 2002/0005845 A1 * | 1/2002 | Kondo et al. ................ 345/204 |
| 2004/0199784 A1 * | 10/2004 | Irisawa et al. ................ 713/200 |
| 2004/0256470 A1 * | 12/2004 | Takami et al. ............... 235/492 |

(Continued)

FOREIGN PATENT DOCUMENTS

JP          02-064888          3/1990

(Continued)

OTHER PUBLICATIONS

Australian Search Report dated Sep. 17, 2008 for Appln. No. SG200801948-1.

(Continued)

*Primary Examiner*—Allyson N Trail
(74) *Attorney, Agent, or Firm*—Pillsbury Winthrop Shaw Pittman, LLP

(57) ABSTRACT

An IC card used as a portable electronic device includes a CPU which performs various processes by executing control programs, a memory which stores data files, and a communicating portion which communicates with an external device. When receiving a command from the external device via the communicating portion, the CPU of the IC card determines whether or not a process corresponding to the command for the data string specified by the command received from the external device can be performed based on one of access conditions set for the respective data strings in the files stored in the memory and performs a command process when it is determined in the above determining process that the command process for the data string specified by the command can be performed.

12 Claims, 6 Drawing Sheets

U.S. PATENT DOCUMENTS

| | | |
|---|---|---|
| 2006/0055564 A1* | 3/2006 | Olsen et al. ................. 340/994 |
| 2006/0214005 A1* | 9/2006 | Agami et al. ............... 235/492 |
| 2007/0260808 A1* | 11/2007 | Raines et al. ............... 711/100 |
| 2008/0013807 A1* | 1/2008 | Bonalle et al. .............. 382/124 |

FOREIGN PATENT DOCUMENTS

| | | |
|---|---|---|
| JP | 08-263353 | 10/1996 |
| JP | 2002-074307 | 3/2002 |

OTHER PUBLICATIONS

Australian Office Action dated May 1, 2009 for Appln. No. SG200801948-1.

* cited by examiner

PORTABLE ELECTRONIC DEVICE AND CONTROL METHOD OF PORTABLE ELECTRONIC DEVICE

CROSS-REFERENCE TO RELATED APPLICATIONS

This application is based upon and claims the benefit of priority from prior Japanese Patent Applications No. 2007-086139, filed Mar. 29, 2007; and No. 2007-142201, filed May 29, 2007, the entire contents of both of which are incorporated herein by reference.

BACKGROUND OF THE INVENTION

1. Field of the Invention

This invention relates to a portable electronic device such as an IC card which performs a process according to a command supplied from an external device, for example, and a control method of the portable electronic device.

2. Description of the Related Art

Conventionally, a portable electronic device such as an IC card performs a process for accessing data stored in a nonvolatile memory as a process performed according to a command supplied from an external device. In the nonvolatile memory of the portable electronic device such as the IC card, various files used to store various data items are defined. For example, in the IC card, files such as MF, DF, EF are managed in a hierarchical structure. Generally, in the IC card of the above file structure, real data is stored in the EF of the nonvolatile memory (for example, refer to Jpn. Pat. Appln. KOKOKU Publication No. 2695857).

Further, in the above operating condition of the IC card, the IC card performs a process according to a command supplied from an IC card processing equipment (external device). For example, the IC card controls access to data items in the nonvolatile memory according to a command which requests access to data stored in the nonvolatile memory.

In addition, the IC card is required to have adequate security for access to respective data items in the nonvolatile memory. Therefore, it is not preferable to unconditionally access data according to a command supplied from an external device. For example, the technique for controlling access to each file according to each command based on the access condition set for each file is disclosed in Jpn. Pat. Appln. KOKAI Publication No. H8-263353. In other words, with the technique described in Jpn. Pat. Appln. KOKAI Publication No. H8-263353, the IC card performs a control operation to permit access to a file which satisfies a preset access condition.

BRIEF SUMMARY OF THE INVENTION

In one aspect of this invention, an object is to provide a portable electronic device capable of efficiently accessing data in a file and a control method of the portable electronic device.

According to one aspect of the present invention, there is provided a portable electronic device which is operated according to a command supplied from an external device and includes a communicating portion which communicates with the external device, a first storage portion which stores files in which a plurality of data strings are stored, a second storage portion which stores access conditions set for respective data strings in the files stored in the first storage portion, a determining portion which determines whether it is possible to perform a command process requested by a command for a data string specified by the command received from the external device via the communicating portion based on the access condition set for each data string stored in the second storage portion, and a control portion which performs the command process when the determining portion determines that it is possible to perform the command process requested by the command for the data string specified by the command.

According to another aspect of the present invention, there is provided a control method of a portable electronic device which is used in the portable electronic device having a memory to store data and operated according to a command supplied from an external device and includes determining whether it is possible to perform a command process requested by a command for a data string specified by the command received from the external device based on one of access conditions set for respective data strings of files stored in the memory when the command is received from the external device, and performing the command process when it is determined in the determining process that it is possible to perform the command process requested by the command for the data string specified by the command.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Now, one embodiment of the present invention will be described with reference to the accompanying drawings.

Figure 1:
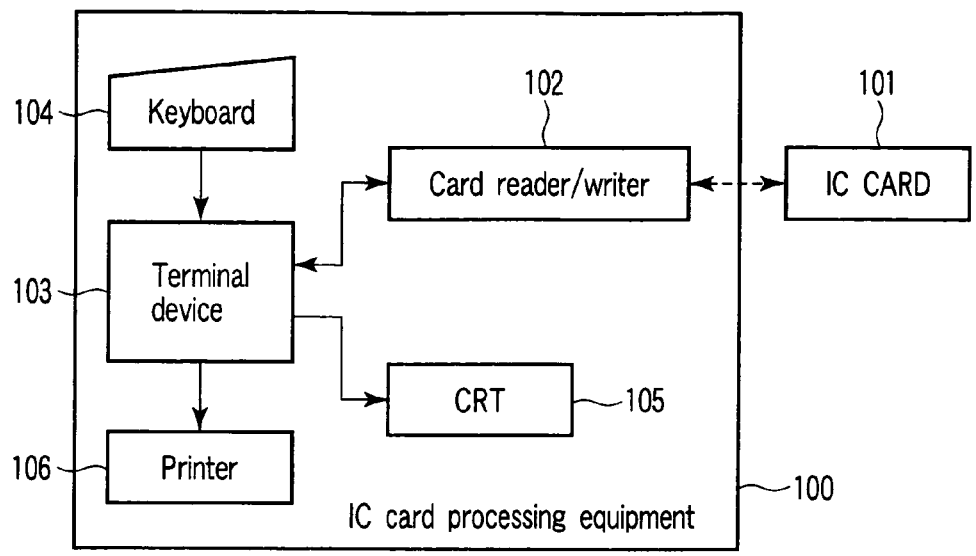
FIG. 1 is a block diagram showing an example of the configuration of an IC card system containing an IC card as a portable electronic device according to one embodiment of this invention.

FIG. 1 shows an example of the configuration of an IC card system containing an IC card as a portable electronic device according to one embodiment of this invention.

The IC card system shown in FIG. 1 includes an IC card processing equipment (external device) 100 and IC card 101. The IC card processing equipment 100 includes a card read/writer 102, terminal device 103, keyboard 104, CRT display portion 105, printer 106 and the like. The IC card 101 can perform data communications with the terminal device 103 via the card reader/writer 102. The terminal device 103 is configured by a computer or the like which performs various processes by causing a control element to execute various control programs and the like stored in a memory (not shown). For example, the terminal device 103 controls data input/output with respect to the IC card 101 by use of the card reader/writer 102. Further, the terminal device 103 performs various processes according to operation instructions input to the keyboard 104 by an operator input. In addition, the terminal device 103 has a function of displaying the process results on the CRT display portion 105 and causing the printer 106 to print the same.

The IC card 101 is set into an operative state when it is supplied with power source voltage from the card reader/writer 102. The IC card 101 performs various processes according to commands supplied from the card reader/writer 102. That is, the card reader/writer 102 supplies power source voltage and commands which request various processes to the IC card 101. As the contents of the commands supplied from the IC card processing equipment 100 to the IC card 101, for example, contents which request data writing, updating, reading, deletion, appending and the like are provided.

Figure 2:
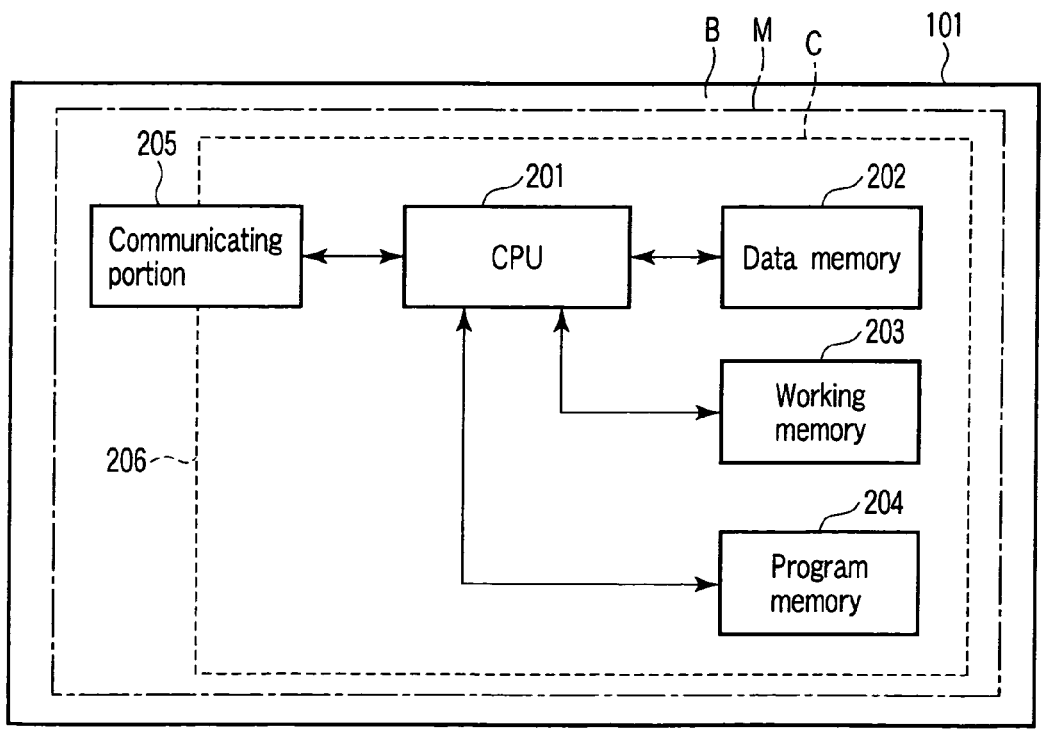
FIG. 2 is a block diagram schematically showing an example of the configuration of an IC card.

FIG. 2 is a diagram showing an example of the configuration of the IC card 101.

As shown in FIG. 2, the IC card 101 includes a CPU 201, data memory 202, working memory 203, program memory 204, communicating portion 205 and the like. The CPU 201, data memory 202, working memory 203, program memory 204 and part (such as a communication control circuit) of the communicating portion 205 are configured by one IC chip 206 or a plurality of IC chips. Further, the IC chip 206 and part (antenna portion or contact portion) of the communicating portion 205 are integrally formed in a module form to configure an IC module M. The IC module M is contained in the main body B of the IC card 101.

The CPU 201 is a control element which performs a control operation in the IC card 101. The CPU 201 performs various processes by executing control programs stored in the program memory 204 or data memory 202. For example, the CPU 201 has a function of performing various processes such as various determining processes, a process of writing a specified data string into the data memory 202 or a process of reading out a specified data string from the data memory 202.

The data memory 202 is a data erasable or rewritable nonvolatile memory. For example, the data memory 202 is configured by a nonvolatile memory such as an EEPROM (electrically erasable and programmable read only memory), flash ROM or the like. Various data items such as various application data items are stored with a preset file structure in the data memory 202.

The working memory 203 is a working memory used to temporarily hold process data when the CPU 201 performs a process. The working memory 203 is configured by a volatile memory such as a RAM (random access memory), for example.

The program memory 204 is a nonvolatile memory in which data cannot be rewritten. For example, the program memory 204 is configured by a mask ROM (read only memory). In the program memory 204, control programs, control data and the like used to control the basic operation of the IC card 101 are stored. The CPU 201 realizes the basic operation of the IC card 101 by executing the control program stored in the program memory 204.

The communicating portion 205 performs data communications with the IC card processing equipment 100. The communicating portion 205 has a configuration corresponding to the communication system of the IC card 101. For example, when the IC card 101 is a contactless (wireless) IC card, the communicating portion 205 is configured by an antenna portion, communication control circuit (modulation/demodulation circuit) and the like. In this case, in the communicating portion 205, modulated waves received by the antenna portion are demodulated by the modulation/demodulation circuit and modulated waves modulated by the modulation/demodulation circuit are transmitted via the antenna portion. Also, when the IC card 101 is a contactless IC card, the communicating portion 205 generates an operation clock and power source voltage to be supplied to an internal circuit based on received modulated waves. Further, when the IC card 101 is a contact IC card, the communicating portion 205 is configured by a contact portion having various terminals which are exposed to the surface of the main body B of the IC card 101. In this case, the communicating portion 205 is brought into contact with an IC card terminal portion (not shown) provided on the external device side (card reader/writer 102) to acquire an operation clock and power source voltage and transmit or receive data.

Next, the data structure of the data memory 202 is explained.

In the data memory 202, a plurality of files managed in the hierarchical structure are defined. For example, the files stored in the data memory 202 are classified into a master file (MF) in the highest hierarchy, a dedicated file (DF) which is a hierarchy coming next to the MF and an elementary file (EF) which is a hierarchy coming next to the DF (or MF). The above files are defined by definition information items and identified by identifiers. Further, in the above file structure, various data items are stored in the EF. In other words, the EF is a data file to store various data items.

Data stored in the EF has plural types of data structures. For example, it is supposed that the data structure stored in the EF is classified into three types of a binary type (Transparent structure), record type (Record structure) and data object type (TLV (Tag Length Value) structure). In the binary type EF (which is hereinafter also referred to as a binary EF), binary-form data is stored. In the record type EF (which is hereinafter also referred to as a record EF), various data items identified by record numbers are stored. Further, in the data object type EF (which is hereinafter also referred to as a data object EF), data of a structure (TLV structure) configured by a tag (T) portion indicating an identifier, a length (L) portion indicating the length of real data and a value (V) portion as real data is stored.

Figure 3:
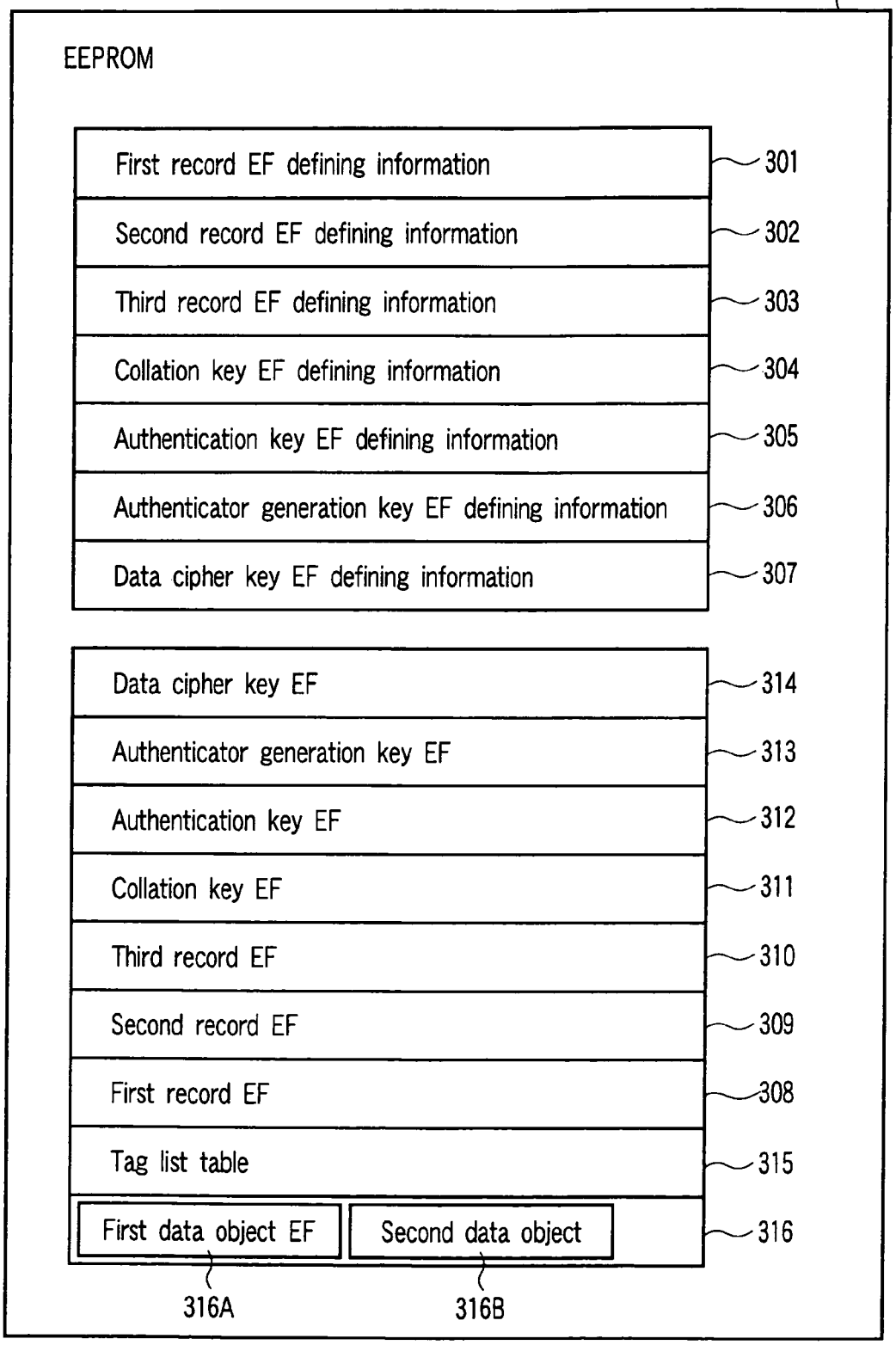
FIG. 3 is a schematic diagram showing an example of the data structure in a data memory.
Figure 4:
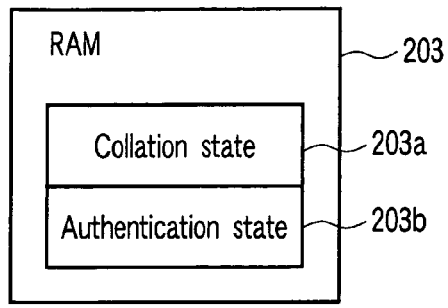
FIG. 4 is a schematic diagram showing an example of the data structure in a working memory.

FIG. 3 shows an example of the data structure in the data memory 202. Further, FIG. 4 shows an example of the data structure stored in the working memory 203.

As shown in FIG. 3, in the data memory 202, a plurality of definition information items and EF bodies defined by the respective definition information items are stored.

In the example shown in FIG. 3, a first record EF 308, second record EF 309, third record EF 310, verification key EF 311, authentication key EF 312, authenticator generation key EF 313, cipher key EF 314, tag list table 315, data object EF 316, definition information 301 of the first record EF 308, definition information 302 of the second record EF, definition information 303 of the third record EF, verification key EF defining information 304, authentication key EF defining information 305, authenticator generation key EF defining information 306 and cipher key EF defining information 307 are stored in the data memory 202.

In the example shown in FIG. 3, the first, second and third record EFs 308, 309, 310 are EFs respectively defined by the definition information items 301, 302, 303. Each record EF has one or a plurality of records in the EF. Identification information is attached to each record of the record EF. Therefore, each record of the record EF can be specified by the identification information of the EF and the identification information of the record in the EF.

Further, the data object EF 316 has one or a plurality of data objects. In the example shown in FIG. 3, data objects 316A and 316B are stored in the data object EF 316. Each of the data objects 316A and 316B has a TLV structure. Each data object stored in the data object EF is specified by "tag". Further, the tag list table 315 is a table to manage "tag" of each data object. Therefore, the data object of "tag" specified by referring to the tag list table 315 is specified. That is, the data object can be specified by "tag" without paying any attention to the EF.

The verification key EF 311 is an EF which stores a verification key. The verification key EF 311 is defined by the verification key EF defining information 304. The authentication key EF 312 is an EF which stores an authentication key. The authentication key EF 312 is defined by the authentication key EF defining information 305. The authenticator generation key EF 313 is an EF which stores an authenticator generation key. The authenticator generation key EF 313 is defined by the authenticator generation key EF defining information 306. The cipher key EF 314 is an EF which stores a cipher key. The cipher key EF 314 is defined by the definition information 307.

Each of the record EFs 308, 309, 310 and data object EF 316 is an EF which reads out or writes data in the record unit or data object unit which is used as a data string unit in response to a command from the external device. Thus, each of the record EFs 308, 309, 310 and data object EF 316 is used as an EF which can be directly accessed (input or output with respect to the exterior) from the external device. The above EFs are also called working EFs (WEF).

On the other hand, the verification key EF 311, authentication key EF 312, authenticator generation key EF 313 and cipher key EF 314 are EFs which store information items associated with the security of the IC card 101. Therefore, the verification key EF 311, authentication key EF 312, authenticator generation key EF 313 and cipher key EF 314 are used as EFs which cannot be directly accessed (accessible only within the IC card 101) from the external device. The above EFs are also called internal EFs (IEF).

In the example shown in FIG. 4, the working memory 203 has an area 203a which stores information indicating a verification state and an area 203b which stores the authentication state. The area 203a is a storage area in which information indicating the verification state set by use of a verification key such as a PIN (for example, a password number, individual identification number) is stored. The area 203b is a storage area in which information indicating the authentication state of the IC card processing equipment 100 as a communication partner or information indicating the authentication state for a received command is stored.

The verification key stored in the verification key EF 311 is internal data (security data) used for a verification process performed in response to a verification command supplied from the IC card processing equipment (external device) 100. For example, the verification key is used as a user ID or password. That is, when a verification command is supplied from the IC card processing equipment (external device) 100, the IC card 101 performs a process for determining whether or not the verification key stored in the verification key EF 311 coincides with a verification key attached to the verification command from the external device as a verification process. The result of the verification process is stored in the area 203a of the working memory 203 which stores information indicating the verification state set by the verification key, for example. The above verification process is performed before a process command such as a data write command or data read command which is based on an execution condition that verification by the verification key is successfully made is executed.

Further, the authentication key stored in the authentication key EF 312 is internal data (security data) used for an authentication process performed in response to an authentication command supplied from the IC card processing equipment (external device) 100. Whether or not the authentication process is successfully performed by a processing procedure utilizing the cipher processing technique is determined in the authentication process. That is, when an authentication command is supplied, the IC card 101 decodes authentication data (ciphered authentication data) attached to the authentication command by use of the authentication key stored in the authentication key EF 312 as an authentication process. When the authentication data is correctly decoded into desired data by the decoding process, the IC card 101 determines that the authentication process is successfully performed. Further, if the authentication data cannot be correctly decoded into desired data by the decoding process, the IC card 101 determines that the authentication process is performed in failure.

For example, the result of the authentication process is stored in the area 203b of the working memory 203 which stores information indicating the authentication state. The above authentication process is performed before a process command such as a data write command or data read command which is based on an execution condition that authentication by the authentication key is successfully made is executed.

An authenticator generation key stored in the authenticator generation key EF 313 and a cipher key stored in the cipher key EF 314 are internal data (security data) used for a secure massaging process. As the secure massaging process, a command authentication process by the authenticator, a ciphering command process by the cipher key or a process of a combination of the command authentication process by the authenticator and the ciphering command process by the cipher key can be assumed.

In the command authentication process by use of the authenticator, an authenticator generated by use of the authenticator generation key based on data which is part of the received command is verified with an authenticator attached to the received command. That is, when a command (which is hereinafter also referred to as a secure messaging command) which requires a secure massaging process is supplied from the IC card processing equipment 100, the IC card 101 generates an authenticator by ciphering data of a specified portion (for example, a header portion or data portion) of the command by use of the authenticator generation key in the authenticator generation key EF 313 as the command authentication process. When the authenticator is generated by use of the authenticator generation key, the IC card 101 verify the generated authenticator with the authenticator attached to the command. If it is determined in the verification step that the verified authenticators coincide with each other, the IC card 101 determines that the command authentication process is successfully performed. Further, if it is determined in the verification step that the verified authenticators do not coincide with each other, the IC card 101 determines that the command authentication process is performed in failure. The result of the command authentication process is stored in the area 203*b* of the working memory 203 which stores information indicating the authentication state for the command, for example. When the above command authentication process is successfully performed, the IC card 101 performs a process corresponding to the command.

In the cipher command process by use of the cipher key, data transferred with respect to the IC card processing equipment is ciphered by use of the cipher key. For example, when a secure messaging command which requests data writing is supplied from the IC card processing equipment 100, the IC card 101 performs a process of decoding a write data portion added to the command by use of the cipher key in the cipher key EF 314 and writing the decoded data into the data memory 202 as a cipher command process. Further, when a secure messaging command which requests data read is supplied from the IC card processing equipment 100, the IC card 101 reads out data specified by the command from the data memory 202, ciphers the read data by use of the cipher key in the data cipher key EF 314 and outputs the ciphered data as read data to the IC card processing equipment 100. That is, the cipher command process is a process for ciphering data transmitted from the IC card processing equipment 100 to the IC card 101 or data transmitted from the IC card 101 to the IC card processing equipment 100.

In the combination process of the command authentication process and the cipher command process, the above command authentication process by use of the authenticator and the above cipher command process are performed. That is, as the combination process, the IC card 101 performs a process for decoding or ciphering a data portion by use of the cipher key when authentication of a command supplied from the IC card processing equipment 100 is successfully made by the command authentication process by use of the authenticator.

Whether or not it is necessary to perform the verification process, authentication process, command authentication process or command cipher process is determined according to an access condition set for each data in each WEF. That is, in the IC card 101, accesses to respective data items in the respective WEFs are controlled according to various processing results set as the access conditions.

Next, an access condition for each data string (for example, record or data object) in each WEF is explained.

First, setting of an access condition for each record in the record EF as the WEF is explained.

Figure 5:
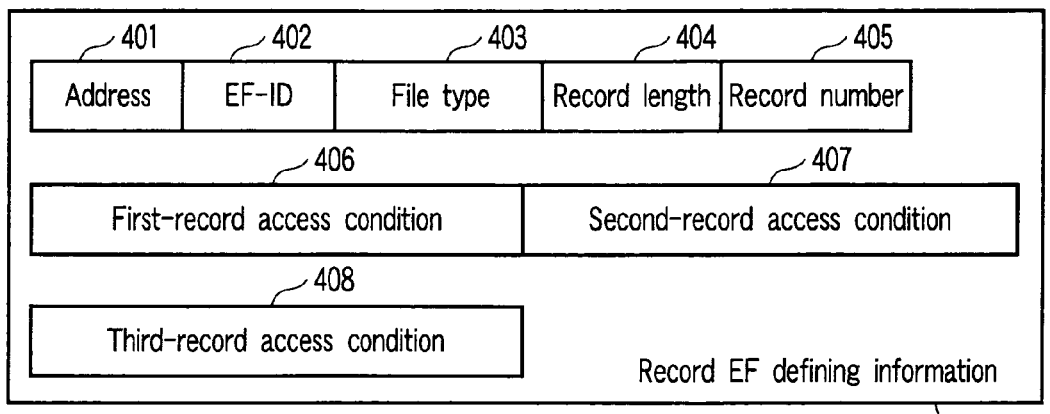
FIG. 5 is a diagram showing an example of the configuration of record EF defining information.

FIG. 5 is a diagram showing an example of the configuration of the record EF defining information. In the example of FIG. 5, the defining information of the record EF which stores three records is shown.

As shown in FIG. 5, the record EF defining information is configured by information items such as an address 401, EF identification information (EF-ID) 402, file type 403 of the EF, record length 404, record number 405, first-record access condition 406, second-record access condition 407, third-record access condition 408 and the like.

The address 401 is address information indicating a position on the data memory 202 in which the EF is defined. The EF-ID 402 is identification information to identify the EF. The file type 403 is information indicating the file type of the EF. In the example of FIG. 5, since the record EF defining information is assumed, the file type 403 is information indicating that the EF is a record EF. The record length 404 is information indicating the size (length) of the EF. The record number 405 is information indicating the number of records stored in the EF. In the example shown in FIG. 5, since it is assumed that three records are stored, the record number 405 is set to "3".

The record access conditions 406, 407, 408 of the records are information items indicating conditions (conditions which permit accesses) to access the respective records stored in the EF. That is, the access condition 406 is information indicating a condition to access the first record stored in the EF. The access condition 407 is information indicating a condition to access the second record stored in the EF. The access condition 408 is information indicating a condition to access the third record stored in the EF.

Figure 6:
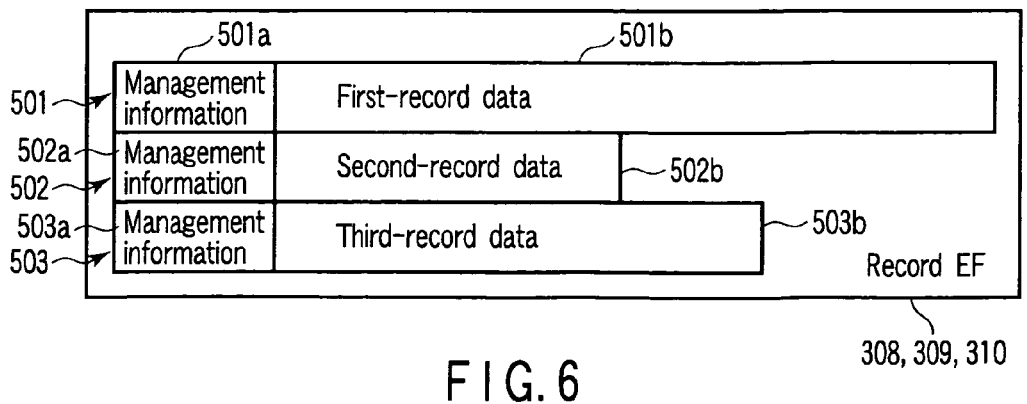
FIG. 6 is a diagram showing an example of the configuration of a record stored in a record EF.

FIG. 6 shows an example of a plurality of records stored in one record EF. In the example shown in FIG. 6, an example of three records 501, 502, 503 stored in one record EF defined by definition information as shown in FIG. 5 is shown. As shown in FIG. 6, the records 501, 502, 503 stored in one record EF respectively include management information items 501*a*, 502*a*, 503*a* and data portions 501*b*, 502*b*, 503*b*. Each of the management information items 501*a*, 502*a*, 503*a* includes record identification information (for example, record number) of each record and information indicating the length of the data portion. Therefore, in the IC card 101, each record can be specified based on the management information (record number and information indicating the length of the data portion) in the record EF defined by the definition information.

Next, the access condition for each record is explained.

As the access conditions 406, 407, 408, access conditions for the respective records can be set for respective various processing contents. For example, In ISO (International Organization for Standardization), a READ RECORD command, WRITE RECORD command, APPEND RECORD command, UPDATE RECORD command and the like are defined as commands which request accesses to the record EF in the IC card. In this case, as the access conditions 406, 407, 408, an access condition for the record in a process (data read process) corresponding to the READ RECORD command, an access condition for the record in a process (data write process) corresponding to the WRITE RECORD command, an access condition for the record in a process (data append process) corresponding to the APPEND RECORD command, an access condition for the record in a process (data update process) corresponding to the UPDATE RECORD command and the like may be considered. Further, as the access conditions 406, 407, 408, an access condition for the record in the secure messaging process of each command can also be considered.

Further, as the access conditions 406, 407, 408 in the data read process, a condition for permitting access (read) according to the result of the authentication process by the authentication key or the verification process by the verification key in addition to a read free or read inhibition can be set. For example, access conditions can be considered in which the read process is permitted only in a state where verification by the verification key is successfully made, the read process is permitted only in a state where authentication by the authentication key is successfully made, the read process is permitted only in a state where verification by the verification key is successfully made or where authentication by the authentication key is successfully made and the read process is permitted only in a state where verification by the verification key is successfully made and authentication by the authentication key is successfully made.

Further, as the access conditions 406, 407, 408 in the data write (or append, update) process, a condition for permitting the write process (or append, update) process according to the result of the authentication process by the authentication key or the verification process by the verification key in addition to a write (or append, update) free or write (or append, update) inhibition can be set. For example, access conditions can be considered in which the write (or append, update) process is permitted only in a state where verification by the verification key is successfully made, the write (or append, update) process is permitted only in a state where authentication by the authentication key is successfully made, the write (or append, update) process is permitted only in a state where verification by the verification key is successfully made or where authentication by the authentication key is successfully made or the write (or append, update) process is permitted only in a state where verification by the verification key is successfully made and authentication by the authentication key is successfully made.

As described above, as the secure messaging process, a command authentication process by use of the authenticator, a ciphering command process by use of the cipher key or a process of a combination of the command authentication process and the ciphering command process are provided. Therefore, as the access condition for the secure messaging process, conditions can be considered in which the secure messaging process is made unnecessary, it is necessary to set a state where the command authentication process by use of the authenticator is successfully performed, the ciphering command process by use of the cipher key is required or the ciphering command process by use of the cipher key is required while the command authentication process by use of the authenticator is successfully performed.

Next, setting of the access condition for each data object in the data object EF as the WEF is explained.

Figure 7A:
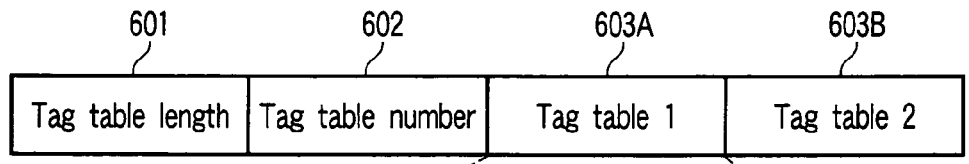
FIG. 7A is a diagram showing an example of the configuration of a tag list table.
Figure 7B:
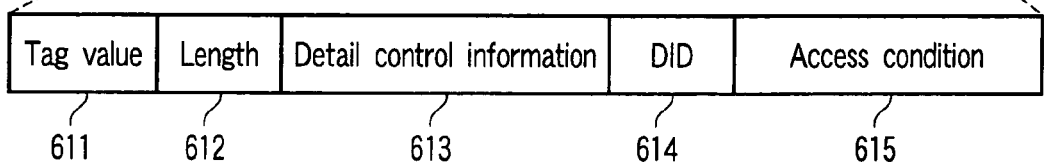
FIG. 7B is a diagram showing an example of the configuration of each tag table.

FIG. 7A is a diagram showing an example of the configuration of the entire portion of the tag list table 315. FIG. 7B is a diagram showing an example of the configuration of each tag table 603.

As described above, in the tag list table 315, information which manages each data object is stored. In the example shown in FIG. 7A, in the tag list table 315, management information items (tag tables 603A, 603B) for two data objects (which are hereinafter referred to as first and second data objects) are stored. Further, as shown in FIG. 7A, in the tag list table 315, table length information 601, tag table number information 602 and a plurality of tag tables 603 (first tag table 603A, second tag table 603B) are contained.

The table length information 601 is information indicating the length of each tag table. The tag table number information 602 is information indicating the number of tag tables stored in the tag list table 315. Each tag table 603 stores management information of a corresponding data object. In FIG. 7A, an example of the tag list table 315 which manages the two data objects is shown. Therefore, in the example shown in FIG. 7A, the first tag table 603A and second tag table 603B are provided as the tag table.

Further, as shown in FIG. 7B, each tag table 603 contains a tag value 611, length information 612, location data 613, file ID (DID) 614, access condition 615 and the like.

The tag value 611 is information indicating the tag which is an identifier of a data object to be managed. The length information 612 is information indicating the length of a data portion (Value) of a to-be-managed data object. The location data 613 is information indicating a location as detail control information of a to-be-managed data object. The file ID 614 is identification information of an EF (data object EF) which stores a to-be-managed data object. The access condition 615 is information indicating the condition to access a to-be-managed data object.

Next, the access condition for each data object is explained.

As the access condition 615, an access condition for the data object can be set for each of various processing contents. For example, in the ISO (International Organization for Standard), a GET DATA command, PUT DATA command and the like are provided as a command which requests access to the record EF in the IC card 101. In this case, as the access condition 615, an access condition for the data object in a process (data read process) corresponding to the GET DATA command and an access condition for the data object in a process (data write process) corresponding to the PUT DATA command are considered. Further, as the access condition 615, an access condition for the data object in a secure messaging process of the command is also considered.

As the access condition 615 in the data read process, a condition for permitting access (read) according to the result of the verification process by the verification key or the authentication process by the authentication key in addition to a read free or read inhibition can be set. For example, access conditions can be considered in which the read process is permitted only in a state where verification by the verification key is successfully made, the read process is permitted only in a state where authentication by the authentication key is successfully made, the read process is permitted only in a state where verification by the verification key is successfully made or where authentication by the authentication key is successfully made and the read process is permitted only in a state where verification by the verification key is successfully made and authentication by the authentication key is successfully made.

As the access condition 615 in the data write process, a condition for permitting a write process according to the result of the verification process by the verification key or the authentication process by the authentication key in addition to a write free or write inhibition can be set. For example, access conditions can be considered in which the write process is permitted only in a state where verification by the verification key is successfully made, the write process is permitted only in a state where authentication by the authentication key is successfully made, the write process is permitted only in a state where verification by the verification key is successfully made or where authentication by the authentication key is successfully made or the write process is permitted only in a state where verification by the verification key is successfully made and authentication by the authentication key is successfully made.

Further, as described above, as the secure messaging process, a command authentication process by use of the authenticator, a ciphering command process by use of the cipher key or a process of a combination of the command authentication process and the ciphering command process are provided. Therefore, as the access condition 615 for the secure messaging process, conditions can be considered in which the secure messaging process is made unnecessary, it is necessary to set a state where the command authentication process by use of the authenticator is successfully made, the ciphering command process by use of the cipher key is required or the ciphering command process by use of the cipher key is required while the command authentication process by use of the authenticator is successfully made.

Next, commands supplied from the IC card processing equipment 100 to the IC card 101 are explained.

Figure 8:
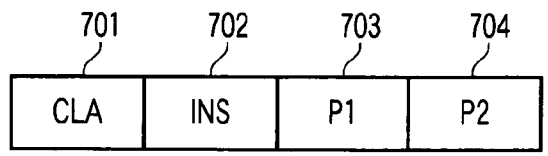
FIG. 8 is a schematic diagram showing an example of a format of a command supplied to an IC card.
Figure 9:
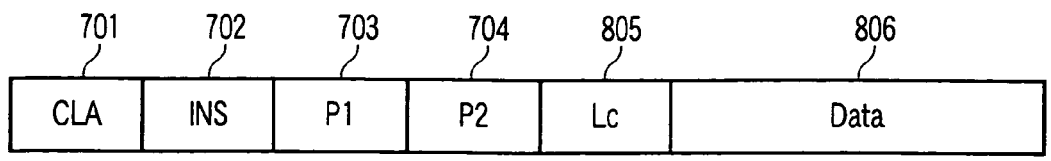
FIG. 9 is a schematic diagram showing an example of a format of a command supplied to an IC card.

FIGS. 8 and 9 show examples of formats of commands supplied from the IC card processing equipment 100 to the IC card 101.

FIG. 8 shows an example of a format of a command having no data portion. For example, it is assumed that a command which requests data read has a format as shown in FIG. 8. As shown in FIG. 8, a command having no data portion such as to-be-written data is configured by a classification portion (CLA: class) 701, instruction portion (INS: instruction) 702, first parameter (P1) 703 and second parameter (P2) 704.

FIG. 9 shows an example of a format of a command having a data portion. For example, it is assumed that a command which requests a data write process has a format as shown in FIG. 9. As shown in FIG. 9, a command having the data portion in which to-be-written data is stored is configured by a data length portion (Lc) 805 and data portion (Data) 806 in addition to a classification portion (CLA: class) 701, instruction portion (INS: instruction) 702, first parameter (P1) 703 and second parameter (P2) 704.

In the classification portion (CLA: class) 701, information indicating the classification of the command is stored. In the instruction portion (INS: instruction) 702, information indicating an instruction of the command is stored. That is, the contents of each command are identified by information items stored in the classification portion 701 and instruction portion 702.

In the first parameter 703 and second parameter 704, information items such as parameters indicating to-be-accessed object of the command are stored. For example, in the case of a command which specifies a record as a to-be-accessed object, data (such as a record number) indicating a record in which data is to be written is stored in the first parameter (P1) 703 and an identifier (EF-ID or the like) indicating a file (record EF) in which a record specified by the first parameter (P1) 703 is stored is stored in the second parameter (P2) 704. Further, in the case of a command which specifies a data object as a to-be-accessed object, tag value of the data object indicating data object to be accessed are stored in the first parameter 703 and second parameter 704.

In the data length portion 805, information indicating the length of the data portion 806 in the command is stored. That is, the data length of the data portion 806 following the data length portion 805 can be determined based on information stored in the data length portion 805. Further, CLA, INS, P1, P2, Lc may be respectively configured with preset data lengths. In this case, the length of the entire portion of the command can be determined based on information indicating the data length and stored in the data length portion 805.

In the data portion 806, data used in a process of the command is stored. For example, in the case of the command which requests data writing, write data is stored in the data portion 806. The length of data to be stored in the data portion 806 is indicated by the data length portion 805. Therefore, data of the length indicated by the data length portion 805 is determined as data stored in the data portion 806 based on next data of the data length portion 805.

Further, in the above command, the presence or absence of the secure messaging process or the contents of the secure messaging process are specified by use of a specified bit. That is, the CPU 201 of the IC card 101 determines whether or not the command requires the secure messaging process or the type of a process required to be performed as the secure messaging process based on the value of the specified bit in the received command.

Next, the command process in the IC card 101 configured as described above is explained.

First, a process for a command (record-series command) which requests access to a specified record in the record EF is explained.

Figure 10:
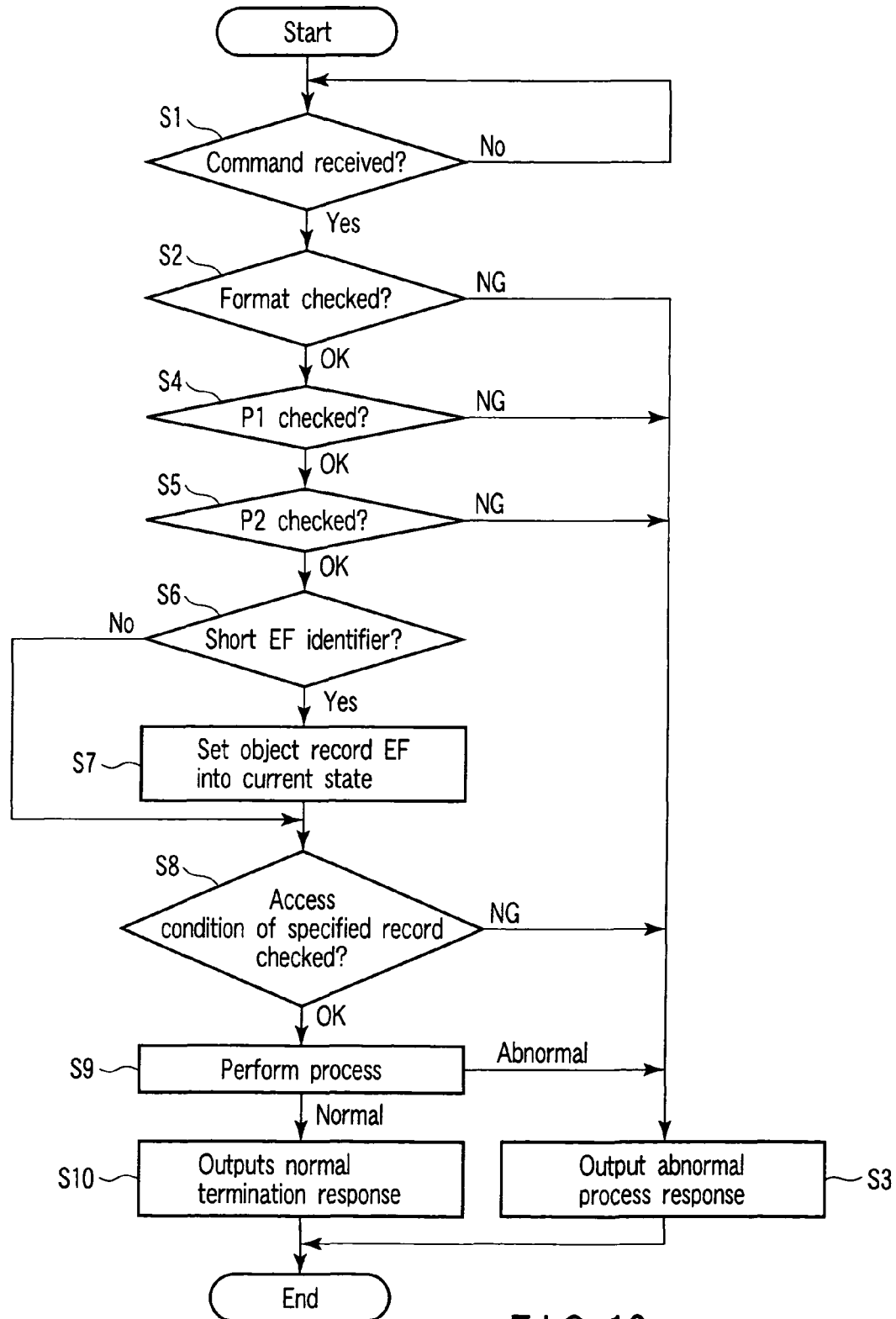
FIG. 10 is a flowchart for illustrating an example of a process for a record-series command.

FIG. 10 is a flowchart for illustrating an example of a process for a record-series command.

The IC card 101 is triggered by power supplied from the IC card processing equipment 100 and set into a command waiting state. In this state, a command supplied from the IC card processing equipment 100 is received by the communicating portion 205 of the IC card 101 and supplied to the CPU 201. In this example, a process performed in a case where a command which requests access to a specified record in the record EF is received is explained.

When a command from the IC card processing equipment 100 is received ("YES" in the step S1), the CPU 201 performs a process for confirming the validity of the command (steps S2 to S5). That is, the CPU 201 first checks the format of the received command (step S2). In the format checking process, it is determined whether data items set in the respective portions are valid or not. For example, the CPU 201 confirms whether the command is a normal command or not in the classification portion 701 and instruction portion 702 of the command. Further, the CPU 201 confirms that invalid values are not set in the first parameter portion 703 and second parameter portion 704. If the data portion is present in the command, the CPU 201 confirms that data stored in the data length portion 805 is not set to a value such as "00" lying outside a prescribed range and that data in the data portion 806 is a data string of the length indicated by the data length portion 805.

If it is detected in the format checking process that the format of the received command is abnormal ("NG" in the step S2), the CPU 201 outputs response data in which a status word indicating a format error of the command is set to the IC card processing equipment 100 (step S3) and terminates the process.

If it is not detected in the format checking process that the format of the received command is abnormal ("OK" in the step S2), the CPU 201 checks whether data stored in the first parameter (P1) 703 of the command is valid or not (step S4). In this example, a process for the record-series command is assumed. Therefore, the CPU 201 checks whether data stored in the first parameter 703 of the command is valid or not as a record number.

If it is determined in the above checking process that the data stored in the first parameter 703 is not valid ("NG" in the step S4), the CPU 201 outputs response data in which a status word indicating a processing error is set to the IC card processing equipment 100 (step S3) and terminates the process.

Further, if it is determined that the data stored in the first parameter 703 is valid ("OK" in the step S4), the CPU 201 checks whether data stored in the second parameter 704 of the command is valid or not (step S5). In this example, since a process for the record-series command is assumed, the CPU 201 checks whether data stored in the second parameter 704 is valid or not as a short EF identifier or current EF identifier.

If it is determined in the above checking process that the data stored in the second parameter 704 is not valid ("NG" in the step S5), the CPU 201 outputs response data in which a status word indicating a processing error is set to the IC card processing equipment 100 (step S3) and terminates the process.

Further, if it is determined that the data stored in the second parameter 704 is valid ("OK" in the step S5), the CPU 201 checks whether EF-ID as the data stored in the second parameter 704 of the command is a short EF identifier or current EF identifier (step S6). If it is determined that the data stored in the second parameter 704 is the short EF identifier ("YES" in the step S6), the CPU 201 sets the EF (record EF) of EF-ID stored in the second parameter 704 into a current state (step S7) and sets the record EF as a to-be-accessed object. Further, if it is determined that the data stored in the second parameter 704 is the current EF identifier ("NO" in the step S6), the CPU 201 sets the EF which is already set in the current state to a to-be-accessed record EF.

When the to-be-accessed record EF is specified, the CPU 201 checks an access condition for the record specified by the first parameter 703 of the command (step S8). That is, the CPU 201 specifies an access condition of a record specified by the second parameter 704 in the definition information of the to-be-accessed record EF specified by the first parameter 703.

For example, when the command is a READ RECORD command, the CPU 201 specifies an access condition for a data read process of a record specified by the command. Further, when the command is a write (append or update) record command, the CPU 201 specifies an access condition for a data write (append or update) process with respect to a record specified by the command.

If the access condition of the record specified by the command is specified, the CPU 201 determines whether the access condition of the record specified by the command is satisfied or not with reference to information indicating the present verification state or authentication state as shown in FIG. 4 as required. That is, the CPU 201 determines whether or not the access condition for the specified record is satisfied, that is, whether a process requested by the command can be performed for the record specified by the command or not by checking the access condition.

If it is determined by checking the access condition that the process requested by the command for the record specified by the command cannot be performed ("NG" in the step S8), the CPU 201 outputs response data in which a status word indicating a processing error is set to the IC card processing equipment 100 (step S3) and terminates the process.

If it is determined by checking the access condition that the process requested by the command for the record specified by the command can be performed ("OK" in the step S8), the CPU 201 performs a process (for example, data read process, write process, append process or update process) corresponding to the command for the record (step S9).

If the process corresponding to the command is performed, the CPU 201 outputs response data in which the result of the command process is set as a status word to the IC card processing equipment 100. That is, when the command process is normally terminated, the CPU 201 outputs response data in which a status word indicating normal termination is set to the IC card processing equipment 100 (step S10) and terminates the process. Further, when the command process is not normally terminated (when an error occurs), the CPU 201 outputs response data in which a status word indicating abnormal termination is set to the IC card processing equipment 100 (step S3) and terminates the process.

In the process for the record-series command, the access control process for each record is performed according to the access condition set in each record in each record EF. Thus, in the IC card, a plurality of records of different conditions are stored not for each file (record EF) unit but in one record EF. As a result, in the IC card, an efficient access control process can be realized for each record in the record EF and highly convenient file management or record management can be realized.

Next, a process for a command (data object-series command) which requests access to a data object is explained.

Figure 11:
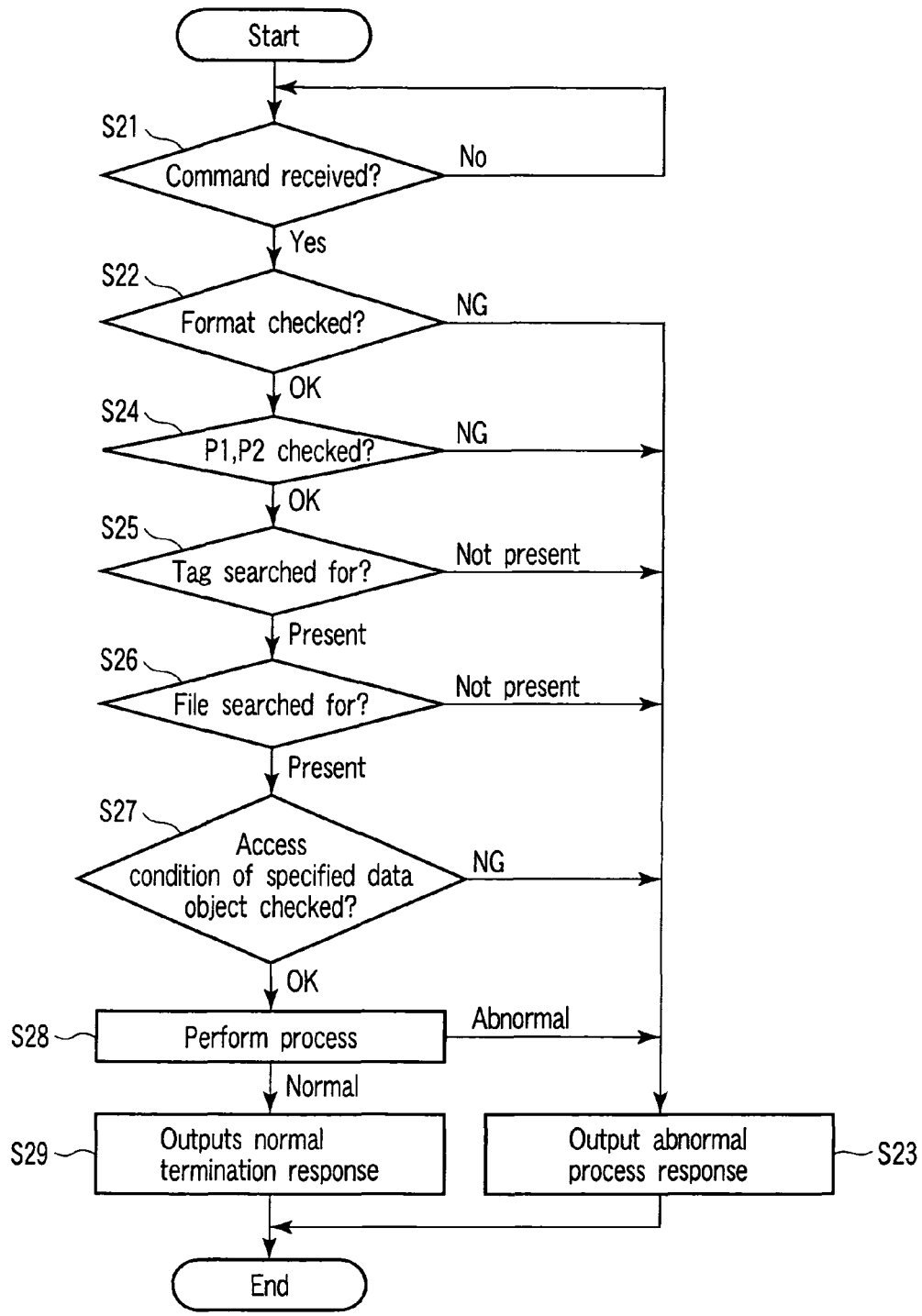
FIG. 11 is a flowchart for illustrating an example of a process for a data object-series command.

FIG. 11 is a flowchart for illustrating an example of a process for a data object-series command.

The IC card 101 is triggered by power supplied from the IC card processing equipment 100 and set into a command waiting state. In this state, a command supplied from the IC card processing equipment 100 is received by the communicating portion 205 of the IC card 101 and supplied to the CPU 201. In this example, a process performed in a case where a command which requests access to a specified data object is received is explained.

When a command from the IC card processing equipment 100 is received ("YES" in the step S21), the CPU 201 performs a process for confirming the validity of the command (steps S22 to S26). That is, the CPU 201 first checks the format of the received command (step S22). In the format checking process, it is determined whether data items set in the respective portions are valid or not. For example, in the classification portion 701 and instruction portion 702 of the command, the CPU 201 confirms whether the command is a normal command or not. Further, in the first parameter portion 703 and second parameter portion 704, the CPU 201 confirms that invalid values are not stored. If a data portion 806 is present in the command, the CPU 201 confirms that data stored in the data length portion 805 is not set to a value such as "00" lying outside a prescribed range and that data in the data portion 806 is a data string of the length indicated by the data length portion 805.

If it is detected in the format checking process that the format of the received command is abnormal ("NG" in the step S22), the CPU 201 outputs response data in which a status word indicating a format error of the command is set to the IC card processing equipment 100 (step S23) and terminates the process.

If it is not detected in the format checking process that the format of the received command is abnormal ("OK" in the step S22), the CPU 201 checks whether data items stored in the first parameter (P1) 703 and second parameter (P2) 704 of the command are valid or not (step S24). In this example, a data object-series command is assumed. Therefore, the CPU 201 checks whether data items stored in the first parameter 703 and second parameter 704 are valid or not as tag values of the data object.

If it is determined that the data items stored in the first parameter 703 and second parameter 704 are not valid ("NG" in the step S24), the CPU 201 outputs response data in which a status word indicating a processing error is set to the IC card processing equipment 100 (step S23) and terminates the process.

Further, if it is determined that the data items stored in the first parameter 703 and second parameter 704 are valid ("OK" in the step S24), the CPU 201 searches the tag list table 315 for the tag table 603 for the data object of the tag values as data items stored in the first parameter 703 and second parameter 704 (step S25).

If it is detected as the searching result of the tag table that a tag table for the data object of the specified tag value is not present ("NOT PRESENT" in the step S25), the CPU 201 outputs response data in which a status word indicating a processing error is set to the IC card processing equipment 100 (step S23) and terminates the process.

Further, if it is detected as the searching result of the tag table that a tag table for the data object of the tag value specified by the command is present ("PRESENT" in the step S25), the CPU 201 searches the data memory 202 for a file (the data object EF which stores the data object) of the file ID (DID) 614 stored in the tag table 603 (step S26).

If it is determined that the data object EF of the file ID 614 specified by the tag table 603 is not present ("NOT PRESENT" in the step S26), the CPU 201 outputs response data in which a status word indicating a processing error is set to the IC card processing equipment 100 (step S23) and terminates the process.

Further, if it is determined that the data object EF of the file ID 614 specified by the tag table 603 is present ("PRESENT" in the step S26), the CPU 201 sets the data object of the tag value specified in the data object EF as a to-be-accessed object.

When the to-be-accessed data object is specified, the CPU 201 checks an access condition for the data object of the tag value (step S27). In this case, the CPU 201 specifies an access condition of the data object based on the tag table for the data object of the tag value specified by the first parameter 703 and second parameter 704 of the command.

For example, when the command is a GET DATA command, the CPU 201 specifies an access condition for a data read process of the specified data object. Further, when the command is a PUT DATA command, the CPU 201 specifies an access condition for a data write process with respect to the specified data object. When the access condition of the data object specified by the command is specified, the CPU 201 determines whether the access condition for the data object specified by the command is satisfied or not with reference to information indicating the present verification state or authentication state as shown in FIG. 4 as required.

The CPU 201 determines whether or not the access condition for the data object specified by the command is satisfied, that is, whether a process requested by the command for the data object specified by the command can be performed or not by checking the access condition as described above.

If it is determined in the above access condition checking process that the process requested by the command for the data object specified by the command cannot be performed ("NG" in the step S27), the CPU 201 outputs response data in which a status word indicating a processing error is set to the IC card processing equipment 100 (step S23) and terminates the process.

Further, if it is determined in the above access condition checking process that the process requested by the command for the data object specified by the command can be performed ("OK" in the step S27), the CPU 201 performs a process (for example, data read process or write process) corresponding to the command for the data object (step S28).

When the process corresponding to the command is performed, the CPU 201 outputs response data in which the result of execution of the command process is set as a status word to the IC card processing equipment 100. For example, when the command process is normally terminated, the CPU 201 outputs response data in which a status word indicating normal termination is set to the IC card processing equipment 100 (step S29) and terminates the process. Further, when the command process is not normally terminated (when an error occurs in the command process), the CPU 201 outputs response data in which a status word indicating abnormal termination is set to the IC card processing equipment 100 (step S23) and terminates the process.

In the process for the data object-series command, the access condition for each data object is set in each tag table and the access control process for each data object is performed according to the access condition for each data object stored in each tag table. Thus, in the IC card, the access condition can be set not in the file unit but for each data object. As the result, in the IC card, an efficient access control process can be realized for each data object and highly convenient file management or record management can be realized.

The process example explained in the above embodiment is not limited to a case wherein the embodiment is applied to the IC card. For example, the above embodiment can be applied to a portable telephone or portable terminal device called a PDA. Further, the portable electronic device to which the present embodiment is applied may be a device obtained by accommodating a module having a function shown in FIG. 2 into part of a booklet, part of a block-shaped main body or part of a tag-shaped main body.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable electronic device which is operated according to a command supplied from an external device, comprising:
 a communicating portion which communicates with the external device,
 a first storage portion which stores files into which a plurality of data strings are stored,
 a second storage portion which stores access conditions set for respective data strings in the files stored in the first storage portion,
 a determining portion which determines whether it is possible to perform a command process requested by a command for a data string specified by the command received from the external device via the communicating portion based on the access condition set for each data string stored in the second storage portion, and
 a control portion which performs the command process when the determining portion determines that it is possible to perform the command process for the data string specified by the command.

2. The portable electronic device according to claim 1, wherein the first storage portion stores record files into which a plurality of records are stored as a plurality of data strings, and the second storage portion stores access conditions set for the respective records.

3. The portable electronic device according to claim 2, wherein the determining portion determines whether it is possible to perform a process requested by a command for a record specified by the command when the command which requests access to the record is received from the external device via the communicating portion.

4. The portable electronic device according to claim 3, wherein the command which requests access to the record is one of a READ RECORD command which requests a data read process for the specified record, a WRITE RECORD command which requests a data write process, an UPDATE RECORD command which requests a data update process and an APPEND RECORD command which requests a record appending process.

5. The portable electronic device according to claim 1, wherein the first storage portion stores a data object file into which a plurality of data objects having preset formats are stored as a plurality of data strings, and the second storage portion stores access conditions set for the respective data objects.

6. The portable electronic device according to claim 5, wherein the determining portion determines whether it is possible to perform a process requested by a command for a data object specified by the command when the command which requests access to the data object is received from the external device via the communicating portion.

7. The portable electronic device according to claim 6, wherein the command which requests access to the data object is one of a GET DATA command which requests a data read process for the specified data object and a PUT DATA command which requests a data write process.

8. The portable electronic device according to claim 1, wherein the second storage portion stores access conditions used to determine whether a possibility of access to each data string is provided according to a result of performance of a specified process.

9. The portable electronic device according to claim 8, wherein the result of performance of the specified process is one of a result of a verification process by a verification key and a result of an authentication process by an authentication key.

10. The portable electronic device according to claim 8, wherein the result of performance of the specified process is a result of a secure messaging process.

11. The portable electronic device according to claim 1, further comprising:
   a module having the communicating portion, first storage portion, second storage portion, determining portion and control portion, and
   a main body which accommodates the module.

12. A control method used for a portable electronic device having a memory to store data and operated according to a command supplied from an external device, comprising:
   determining whether it is possible to perform a command process requested by a command for a data string specified by the command received from the external device based on one of access conditions set for respective data strings of files stored in the memory when the command is received from the external device, and
   performing the command process when it is determined in the determining process that it is possible to perform the command process requested by the command for the data string specified by the command.

* * * * *